United States Patent
Antoine et al.

(10) Patent No.: US 11,983,563 B2
(45) Date of Patent: May 14, 2024

(54) CONTEXTUAL INFORMATION EXTRACTOR WITH MODEL EXPLAINABILITY CALCULATOR

(71) Applicant: BANK OF AMERICA CORPORATION, Charlotte, NC (US)

(72) Inventors: Vinodh Sagayaraj Antoine, Chennai (IN); Sandeep Kumar Chauhan, Hyderabad (IN); Madhuri Aniruddha Deshpande, Mumbai (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 1318 days.

(21) Appl. No.: 16/406,732

(22) Filed: May 8, 2019

(65) Prior Publication Data
US 2020/0356882 A1 Nov. 12, 2020

(51) Int. Cl.
*G06Q 30/0201* (2023.01)
*G06F 9/50* (2006.01)
*G06N 20/00* (2019.01)
*G06N 5/022* (2023.01)

(52) U.S. Cl.
CPC .......... *G06F 9/5011* (2013.01); *G06N 20/00* (2019.01); *G06Q 30/0201* (2013.01); *G06N 5/022* (2013.01)

(58) Field of Classification Search
CPC ...... G06F 9/5011; G06N 20/00; G06N 5/022; G06Q 30/0201
See application file for complete search history.

(56) References Cited

U.S. PATENT DOCUMENTS

| | | | |
|---|---|---|---|
| 8,556,165 B2 | 10/2013 | Kapis et al. | |
| 9,576,292 B2 | 2/2017 | Freishtat et al. | |
| 9,648,167 B2 | 5/2017 | Riahi et al. | |
| 9,986,094 B2 | 5/2018 | Piaggio et al. | |
| 10,140,650 B2 | 11/2018 | Roberts et al. | |
| 10,178,059 B1 * | 1/2019 | Garg | H04L 51/08 |
| 10,515,317 B1 * | 12/2019 | Kenthapadi | G06Q 50/01 |

(Continued)

OTHER PUBLICATIONS

Patterns of Multi stakeholder Recommendation (Year: 2017).*

(Continued)

*Primary Examiner* — Gautam Ubale
(74) *Attorney, Agent, or Firm* — Moore & Van Allen PLLC; James C. Edwards

(57) ABSTRACT

Embodiments of the invention are directed to accurate resource interaction opportunity decisioning. Contextual information is extracted, in real-time or otherwise, which takes into account the circumstances surrounding the presentation of resource interaction opportunities to the potential user. A decisioning model from amongst a plurality of models is determined based on implementation of an explainability calculator that assesses the accuracy, peril and complexity of the models in relation to the resource interaction opportunity decisions rendered by the models. A relationship builder is implemented that is configured to build a relationship network amongst potential users and resource interaction opportunity providers and subsequently use the indirect relationships provided by the network as a basis for determining which resource interaction opportunity providers should provide resource interaction opportunities to the potential users.

10 Claims, 6 Drawing Sheets

(56) References Cited

U.S. PATENT DOCUMENTS

| | | | | |
|---|---|---|---|---|
| 2012/0123844 | A1* | 5/2012 | Fano | G06Q 30/0207 |
| | | | | 705/26.7 |
| 2013/0179265 | A1* | 7/2013 | Winslade | G06Q 30/0261 |
| | | | | 705/14.58 |
| 2013/0198061 | A1* | 8/2013 | Dheer | G06Q 20/425 |
| | | | | 705/39 |
| 2014/0040044 | A1* | 2/2014 | Patel | G06Q 30/0237 |
| | | | | 705/14.66 |
| 2014/0282559 | A1* | 9/2014 | Verduzco | G06Q 10/10 |
| | | | | 718/102 |
| 2015/0100412 | A1* | 4/2015 | Sterns | G06Q 30/0242 |
| | | | | 705/14.41 |
| 2015/0135282 | A1* | 5/2015 | Kong | H04L 63/105 |
| | | | | 726/4 |
| 2015/0242857 | A1* | 8/2015 | Wilcox | G06Q 20/4016 |
| | | | | 705/44 |
| 2016/0062972 | A1* | 3/2016 | Ramakrishnan | G06F 40/186 |
| | | | | 715/226 |
| 2017/0004396 | A1* | 1/2017 | Ghotbi | G06F 3/04842 |
| 2017/0094019 | A1* | 3/2017 | Ahmed | G06Q 10/10 |
| 2019/0034484 | A1* | 1/2019 | Das | G06N 3/08 |
| 2020/0074562 | A1* | 3/2020 | Johnson | G06F 16/23 |
| 2020/0151651 | A1* | 5/2020 | Chang | G06Q 10/063118 |
| 2020/0356882 | A1* | 11/2020 | Antoine | G06F 9/5011 |
| 2021/0294557 | A1* | 9/2021 | Lam | G06F 16/9577 |

OTHER PUBLICATIONS

Big Data Services (Year: 2018).*
Mining_Social_Media_Challenges_and_Opportunities (Year: 2013).*
Interactions_with_Resources (Year: 2013).*

* cited by examiner

CONTEXTUAL INFORMATION EXTRACTOR WITH MODEL EXPLAINABILITY CALCULATOR

FIELD OF THE INVENTION

The present invention is generally directed to resource interaction opportunity decisioning and, more specifically, making informed resource interaction opportunity decisions that take into account indirect relationships between resource interaction opportunity users and providers and real-time contextual data and determine the ideal machine-learning model to render the decisioning based on accuracy, peril and complexity factors.

BACKGROUND

Resource interaction opportunities are presented to potential users at various times using various platforms. However, if the decisioning on which resource interaction opportunities to present to a potential user is random, the likelihood of the potential user accepting any one of the resource interaction opportunities is highly unlikely.

In order for resource interaction opportunities to be more directed and/or focused to the needs or desires of the potential user, the decisioning needs to take into account various factors in the process. For example, if the potential user is conducting or is contemplating conducting a resource interaction, the decisioning process benefits from using data that understands the context of the resource interaction. Moreover, the decisioning process benefits from having knowledge of the potential users direct or indirect relationships with resource interaction opportunity providers (i.e., willingness of the potential user to engage a resource interaction opportunity provider or the like).

Moreover, the decisioning process typically involves implementation of an artificial intelligence (AI) and/or Machine Learning (ML) model. While most such models will result in acceptable decisioning, the model itself provides no knowledge as how the decision was rendered.

Therefore, a need exists to develop systems, method, computer-program products and the like that improve the overall resource interaction opportunity decisioning process. The desired systems, method, computer-program products and the like should provide for decisioning that takes into account direct and indirect relationships between resource interaction opportunity users and providers. In addition, desired systems, method, computer-program products and the like should account for the current context of the resource interaction opportunity user. In this regard, the decisioning should provide for real-time determination and implementation of context data. Moreover, desired systems, method, computer-program products and the like should be capable of justifying the implementation of an ML model in the decisioning process, such that, MT model implemented and resource interaction opportunities resulting from the decisioning process are those that are best suited for the potential user under the current context/circumstances.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing systems, computer-program products, methods and/or the like for improved decisioning of resource interaction opportunities for potential users. Specifically, the present invention implements a contextual information extractor that is configured to extract/compile contextual data associated with the decisioning process to insure the relevancy, accuracy and timeliness of the decision. In this regard, the contextual information extractor is capable of extracting information in real-time associated with an event, such as a contemplated or ongoing resource interaction, that triggers the decisioning.

In addition, the systems, computer-program products, methods and/or the like herein provide for a decisioning process that determines the optimal machine-learning model/algorithm to use in the decisioning process through implementation of an explainability calculator. The explainability calculator is configured to determine one or more explainability indices that take into account the accuracy, peril and complexity of the model/algorithm in respect to the opportunities resulting from the model/algorithm.

Moreover, in additional embodiments of the invention, a relationship builder is implemented to determine which resource interaction providers have indirect relationships with the potential users, such that the decisioning process results in resource interaction opportunities provided by the direct and/or indirectly related resource interaction opportunity providers.

As such, the present invention insures that the resource interaction opportunities presented to the potential user are ones that are the most relevant to the current context of the potential user and provided by resource interaction opportunity providers that are directly or indirectly related to the potential user (i.e., the resource interaction opportunities that the potential user is most likely to accept/act upon).

A system for decisioning resource interaction opportunities defines first embodiments of the invention. The system includes a computing platform including a memory and at least one processor in communication with the memory. The system additional includes a contextual information extractor module that is stored in the memory and executable by the least one processor. The contextual information extractor is configured to, at a time for decisioning resource interaction opportunities for a resource interaction opportunity user, receive from one or more first data sources, data associated with the resource interaction opportunity user, and extract contextual data from the data associated with the resource interaction opportunity user. The system further includes a resource interaction opportunity decisioning module that includes a plurality of machine-learning models and an explainability calculator. The resource interaction opportunity decisioning module is stored in the memory and executable by the at least one processor. The resource interaction opportunity decisioning module is configured to receive the contextual data from the contextual information extractor module and execute at least two of the machine-learning models using the contextual data to determine one or more resource interaction opportunities for each of the executed machine-learning models. The resource interaction opportunity decisioning module is further configured to implement the explainability calculator to determine one or more explainability indices for each of the executed machine-learning models, wherein the explainability indices are based on (i) an accuracy of a machine-learning model, (ii) a peril associated with the one or more resource interaction opportunities determined by a machine-learning model and (iii) a complexity factor associated with the machine-learning model. Further, the model is configured to determine which of the one or more resource interaction opportunities resulting from one of the executed machine-learning models to present to the resource interaction opportunity user based at least on the one or more explainability indices associated with each of the executed machine-learning models.

In specific embodiments of the system, the first data sources from which the contextual information extractor receives data include an event hub that provides at least one of (i) real-time data associated with a current user resource interaction triggering the decisioning of the resource interaction opportunities, and (ii) historical data associated with previous resource interactions performed by the resource interaction opportunity user. In other related embodiments of the system, the first data sources include a user device configured to provide geo-location information that establishes a current location of the resource interaction opportunity user.

In other specific embodiments of the system, the resource interaction opportunity decisioning module is further configured to receive relationship data that indicates indirect relationships between a plurality of resource interaction opportunity users and resource interaction opportunity providers, and execute the at least two of the machine-learning models using the contextual data and the relationship data to determine one or more resource interaction opportunities for each of the executed machine-learning models.

In specific related embodiments the system includes a relationship builder module that is stored in the memory, and executable by the at least one processor. The relationship builder module is configured to receive, from a plurality of second data sources, (i) resource interaction opportunity user data associated with a plurality of resource interaction opportunity users, and (ii) resource interaction opportunity provider data associated with a plurality of resource interaction opportunity providers, and using that data, determine the relationship data that indicates indirect relationships between a plurality of resource interaction opportunity users and resource interaction opportunity providers. In specific related embodiments of the system the second data sources comprising a historical resource interaction database, feedback database, user and provider information database, and previous resource interaction opportunity acceptance database. In further related embodiments of the system the relationship builder module is configured to establish a relationship network between the plurality of resource interaction opportunity users and the plurality of resource interaction opportunity providers based on the resource interaction opportunity user data and the resource interaction opportunity provider data, wherein the relationship network identifies indirect relationships between the resource interaction opportunity users and the resource interaction opportunity providers. In such embodiments of the system, the relationship builder module is further configured to establish the relationship network by calculating weighted distances between a plurality factors of previous resource interactions conducted by the resource interaction opportunity users and the resource interaction opportunity providers, determining resource interaction patterns for the resource interaction opportunity users and the resource interaction opportunity providers, and establishing the relationship network based on the resource interaction patterns. The factors may include, but are not limited to, temporal proximity of previous resource interactions, type of resource interaction, volume of resource interaction, parties to a resource interaction, and re-occurrence of resource interaction.

In yet other specific embodiments of the system, the resource interaction opportunity decisioning module is further configured to implement the explainability calculator to determine at least one of a score or category for (i) the accuracy of a machine-learning model, (ii) the peril associated with the one or more resource interaction opportunities determined by a machine-learning model and (iii) the complexity factor associated with the machine-learning model.

Moreover, in further embodiments of the system, the resource interaction opportunity decisioning module is further configured to determine which of the one or more resource interaction opportunities resulting from one of the executed machine-learning models to present to the resource interaction opportunity user based at least on historical data associated with acceptance and rejections of previously presented resource interaction opportunities presented to the resource interaction opportunity user. In related embodiments the system includes a resource interaction opportunity tracking module that is stored in the memory, executable by the at least one processor and configured to track and record acceptance and rejection of resource interaction opportunities by a plurality of resource interaction opportunity users.

In additional embodiments the system includes a resource interaction opportunity presentation module that is stored in the memory and executable by the processor. The resource interaction opportunity presentation module is configured to present to the resource interaction opportunity user the one or more resource interaction opportunities determined by the resource interaction opportunity decisioning module. In specific embodiments of the system, the resource interaction opportunity presentation module is further configured to launch on a user device in response to a user initiating a resource interaction event, and present to the resource interaction opportunity user the one or more resource interaction opportunities while the user is performing the resource interaction event. In other related embodiments of the system, the resource interaction opportunity presentation module is further configured to be incorporated into a mobile application or online portal, such that, the one or more resource interaction opportunities are presented to the user in response to the user logging in or accessing the mobile application or online portal.

A computer program product comprising a non-transitory computer-readable medium defines second embodiments of the invention. The computer-readable medium includes a first set of codes for causing a computer to, at a time for decisioning resource interaction opportunities for a resource interaction opportunity user, receive, from one or more first data sources, data associated with the resource interaction opportunity user, and extract contextual data from the data associated with the resource interaction opportunity user. The computer-readable medium additionally includes a second set of codes for causing a computer to receive the contextual data from the contextual information extractor module, execute at least two machine-learning models based at least on the contextual data to determine one or more resource interaction opportunities for each of the executed machine-learning models. In addition the computer-readable medium includes a third set of codes for causing a computer to determine one or more explainability indices for each of the executed machine-learning models, wherein the explainability indices are based on (i) an accuracy of a machine-learning model, (ii) a peril associated with the one or more resource interaction opportunities determined by a machine-learning model and (iii) a complexity factor associated with the machine-learning model, and a fourth set of codes for causing a computer to determine which of the one or more resource interaction opportunities resulting from one of the executed machine-learning models to present to the resource interaction opportunity user based at least on the one or more explainability indices associated with each of the executed machine-learning models.

In additional embodiments of the computer program product the non-transitory computer-readable medium additionally includes a fifth set of codes for causing a computer to receive, from a plurality of second data sources, (i) resource interaction user opportunity data associated with a plurality of resource interaction opportunity users, and (ii) resource interaction opportunity provider data associated with a plurality of resource interaction opportunity providers. In addition, the computer-readable medium additionally includes a sixth set of codes for causing a computer to, using the data, determine the relationship data that indicates indirect relationships between a plurality of resource interaction opportunity users and resource interaction opportunity providers. In such embodiments of the computer program product, the second set of codes is further configured to cause the computer to execute the at least two machine-learning models using the contextual data and the relationship data to determine one or more resource interaction opportunities for each of the executed machine-learning models.

In further embodiments of the computer program product, the first set of codes is further configured to cause the computer to receive, from the first data sources, the data associated with the resource interaction opportunity user; the first data sources including an event hub that provides at least one of (i) real-time data associated with a current user resource interaction triggering the decisioning of the resource interaction opportunities, and (ii) historical data associated with previous resource interactions performed by the resource interaction opportunity user.

A computer-implemented method for decisioning resource interaction opportunities defines third embodiments of the invention. The method is executed by one or more computing device processors. The method includes, at a time for decisioning resource interaction opportunities for a resource interaction opportunity user, receiving, from one or more first data sources, data associated with the resource interaction opportunity user and extracting contextual data from the data associated with the resource interaction opportunity user. The method further includes executing at least two machine-learning models based using the contextual data to determine one or more resource interaction opportunities for each of the executed machine-learning models. Moreover, the method includes determining one or more explainability indices for each of the executed machine-learning models, wherein the explainability indices are based on (i) an accuracy of a machine-learning model, (ii) a peril associated with the one or more resource interaction opportunities determined by a machine-learning model and (iii) a complexity factor associated with the machine-learning model, and determining which of the one or more resource interaction opportunities resulting from one of the executed machine-learning models to present to the resource interaction opportunity user based at least on the one or more explainability indices associated with each of the executed machine-learning models.

In specific embodiments the computer-implemented method further includes receiving, from a plurality of second data sources, (i) resource interaction user opportunity data associated with a plurality of resource interaction opportunity users, and (ii) resource interaction opportunity provider data associated with a plurality of resource interaction opportunity providers, and, based on the data, determining the relationship data that indicates indirect relationships between a plurality of resource interaction opportunity users and resource interaction opportunity providers. In such embodiments of the method, executing the at least two machine-learning models further included executing the least two machine-learning models using the contextual data and the relationship data to determine one or more resource interaction opportunities for each of the executed machine-learning models.

Thus, according to embodiments of the invention, which will be discussed in greater detail below, the present invention provides for accurate resource interaction opportunity decisioning. Specifically, the invention provides for extracting contextual information, in real-time or otherwise, that takes into account the circumstances precipitating the presentation of resource interaction opportunities to the potential user. In addition, the invention provides for determining which decisioning model to use from amongst a plurality of models based on the accuracy, peril and complexity of the models in relation to the resource interaction opportunity decisions rendered by the models. Moreover, in additional embodiments of the invention, a relationship builder is implemented that is configured to build a relationship network amongst potential users and resource interaction opportunity providers and subsequently uses the network as a basis for determining which resource interaction opportunity providers should provide resource interaction opportunities to the potential users.

The features, functions, and advantages that have been discussed may be achieved independently in various embodiments of the present invention or may be combined with yet other embodiments, further data of which can be seen with reference to the following description and drawings.

BRIEF DESCRIPTION OF THE DRAWINGS

Figure 1:
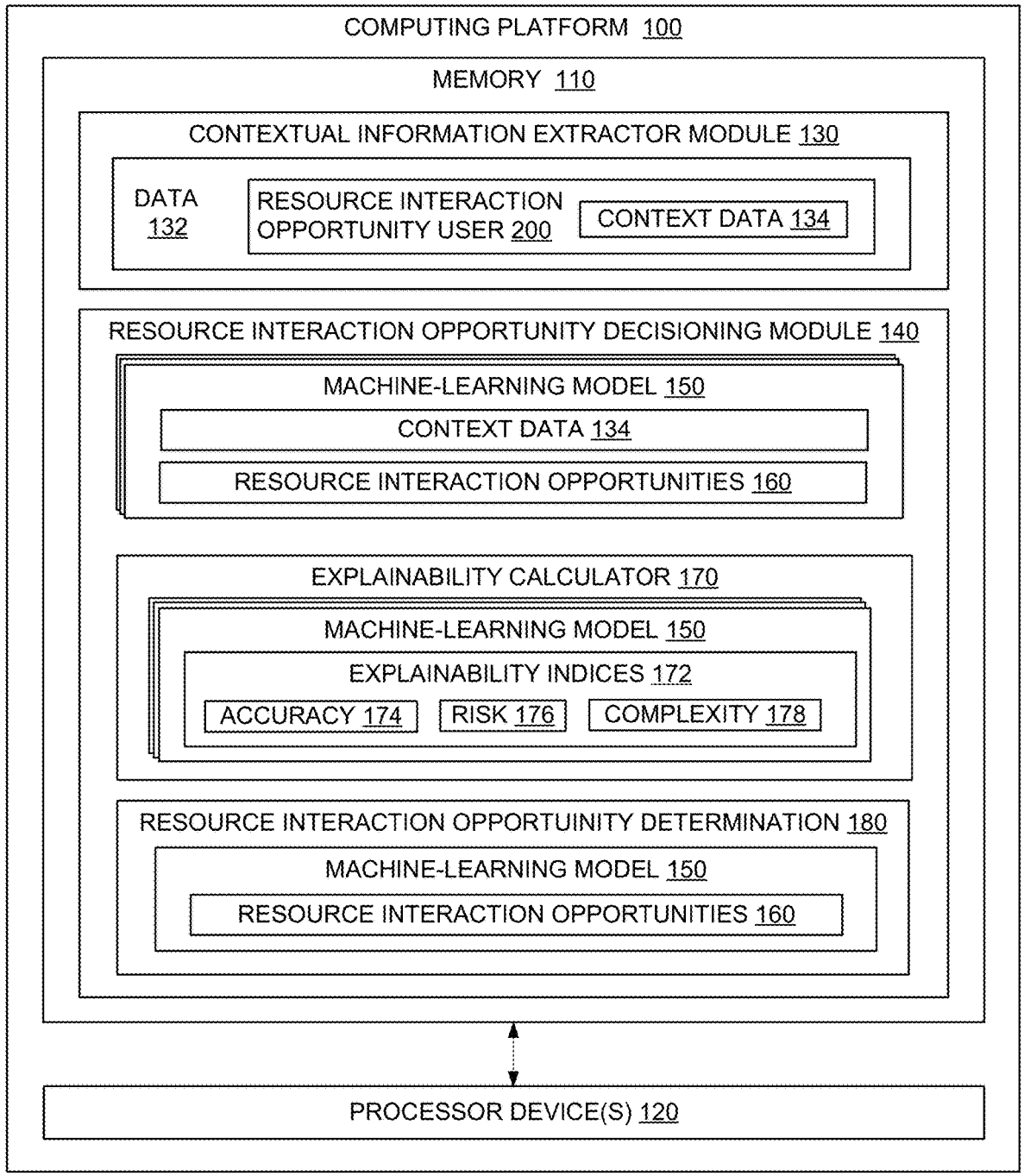
Figure 2:
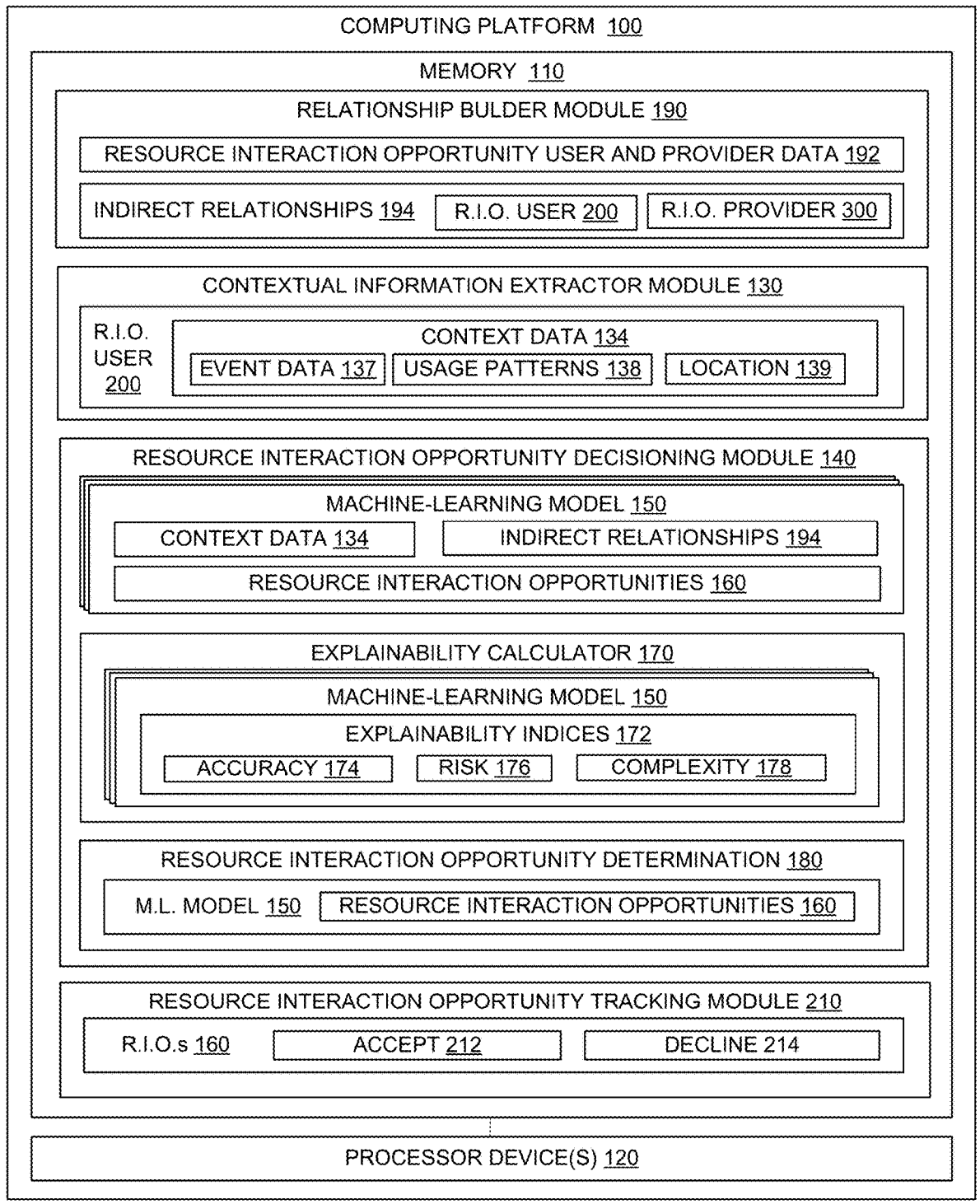
Figure 3:
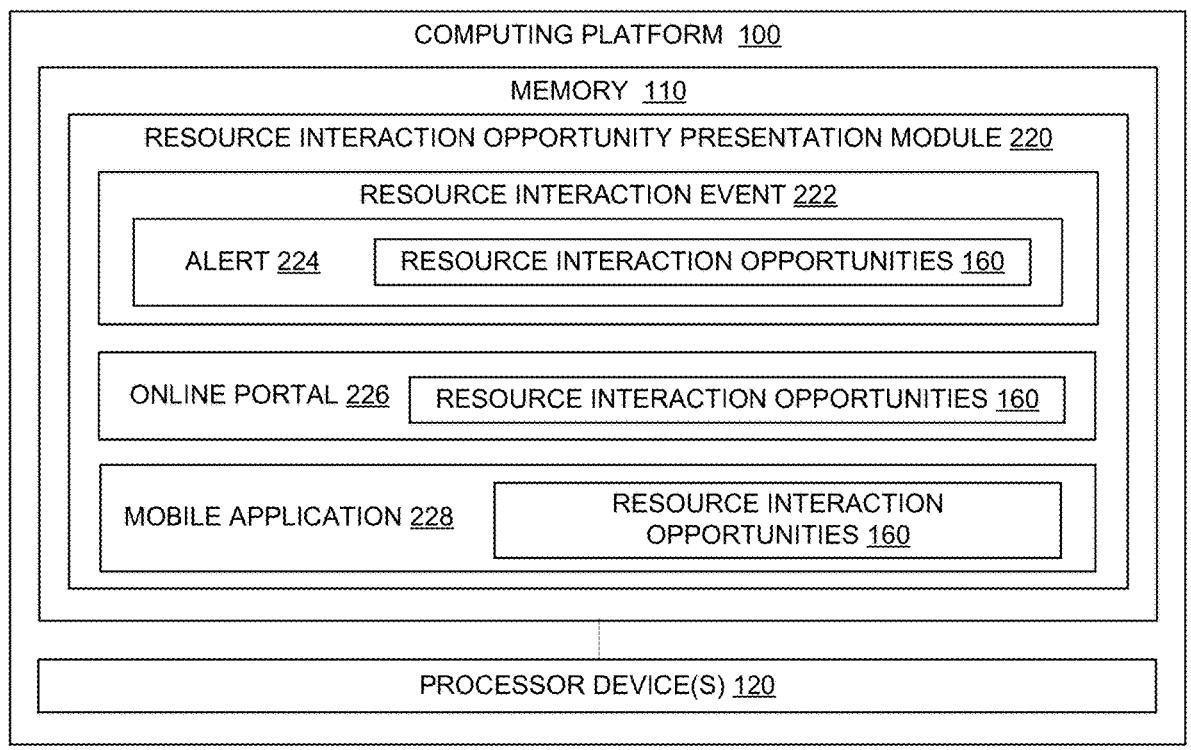
Figure 4:
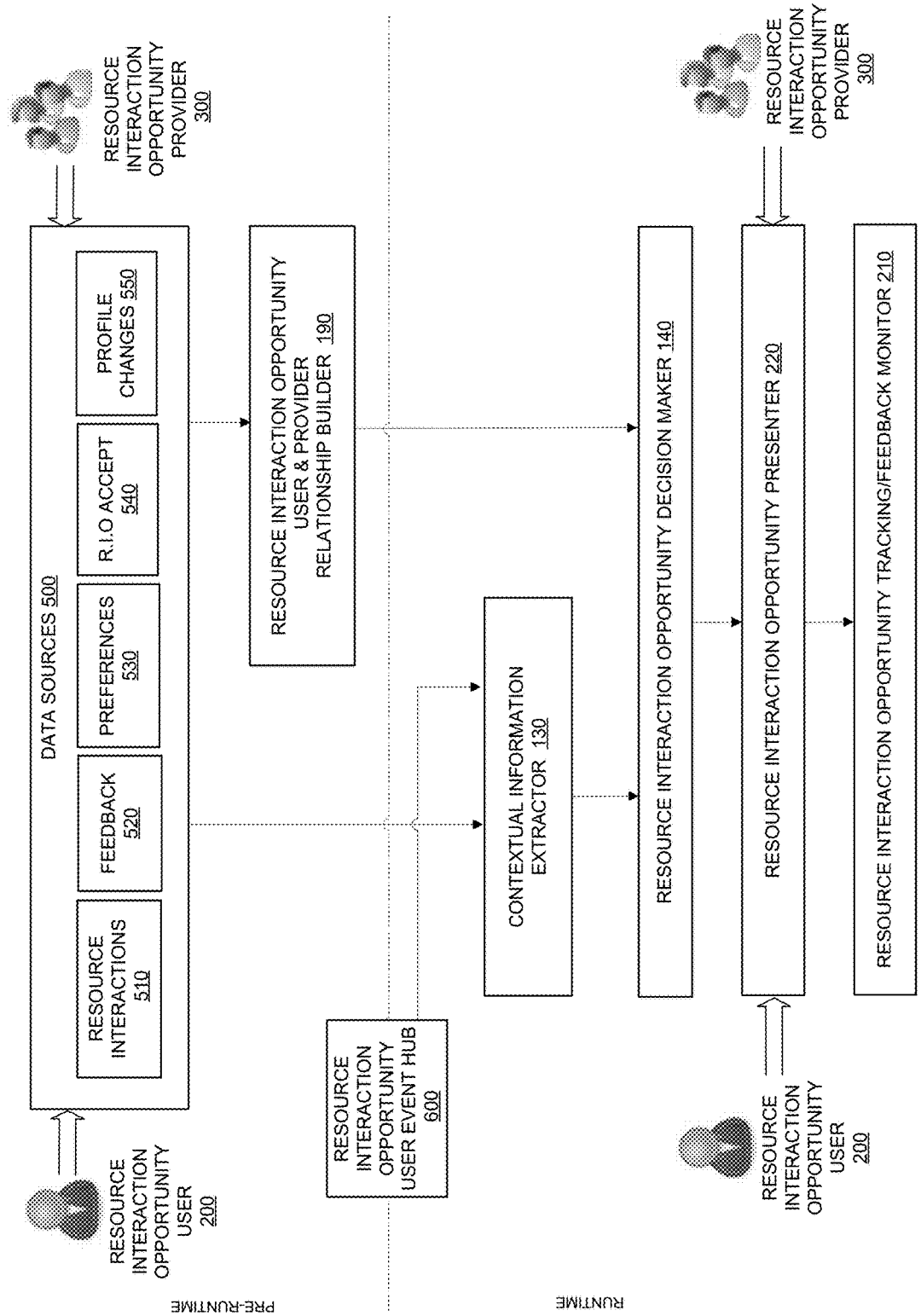
Figure 5:
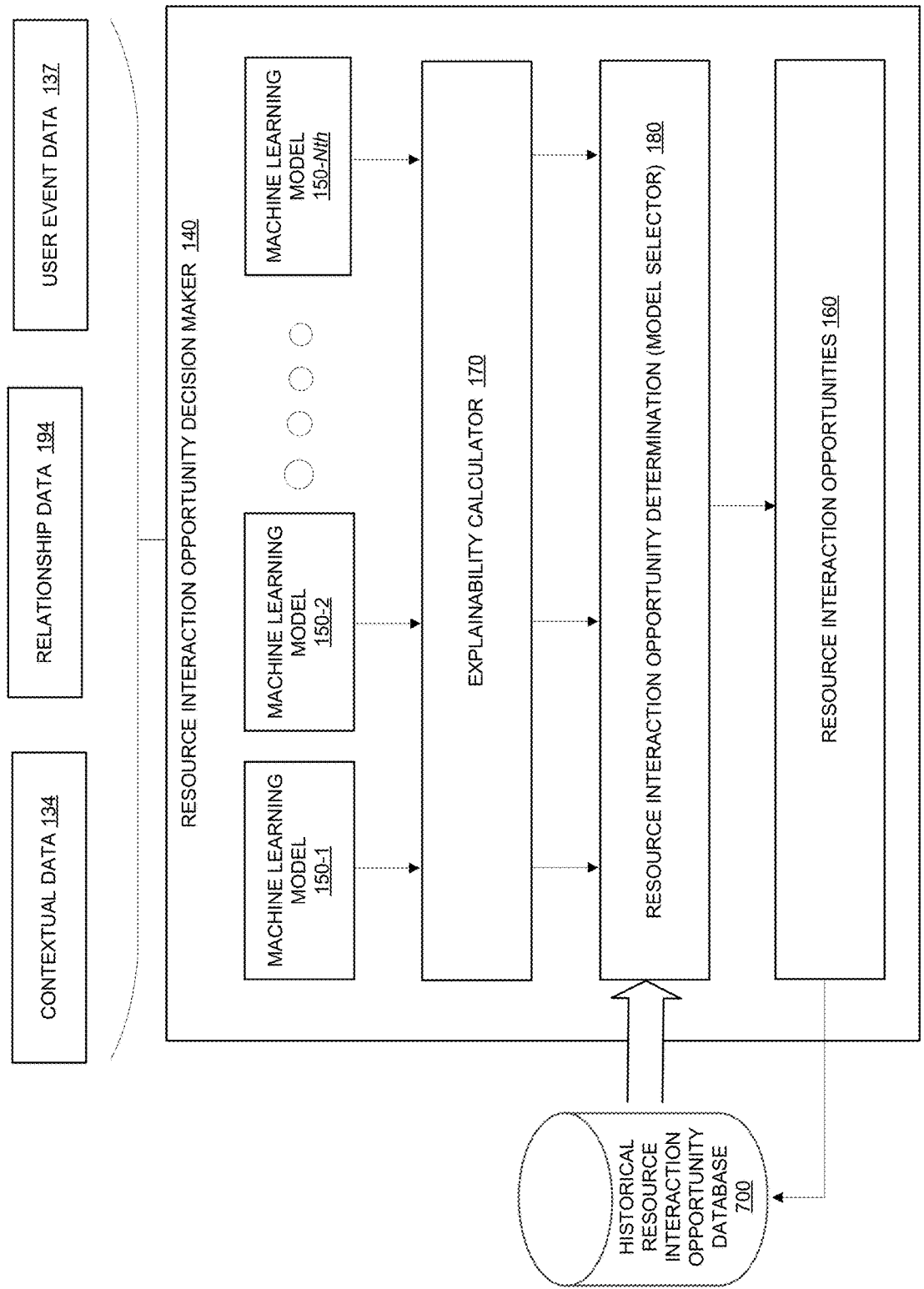
Figure 6:
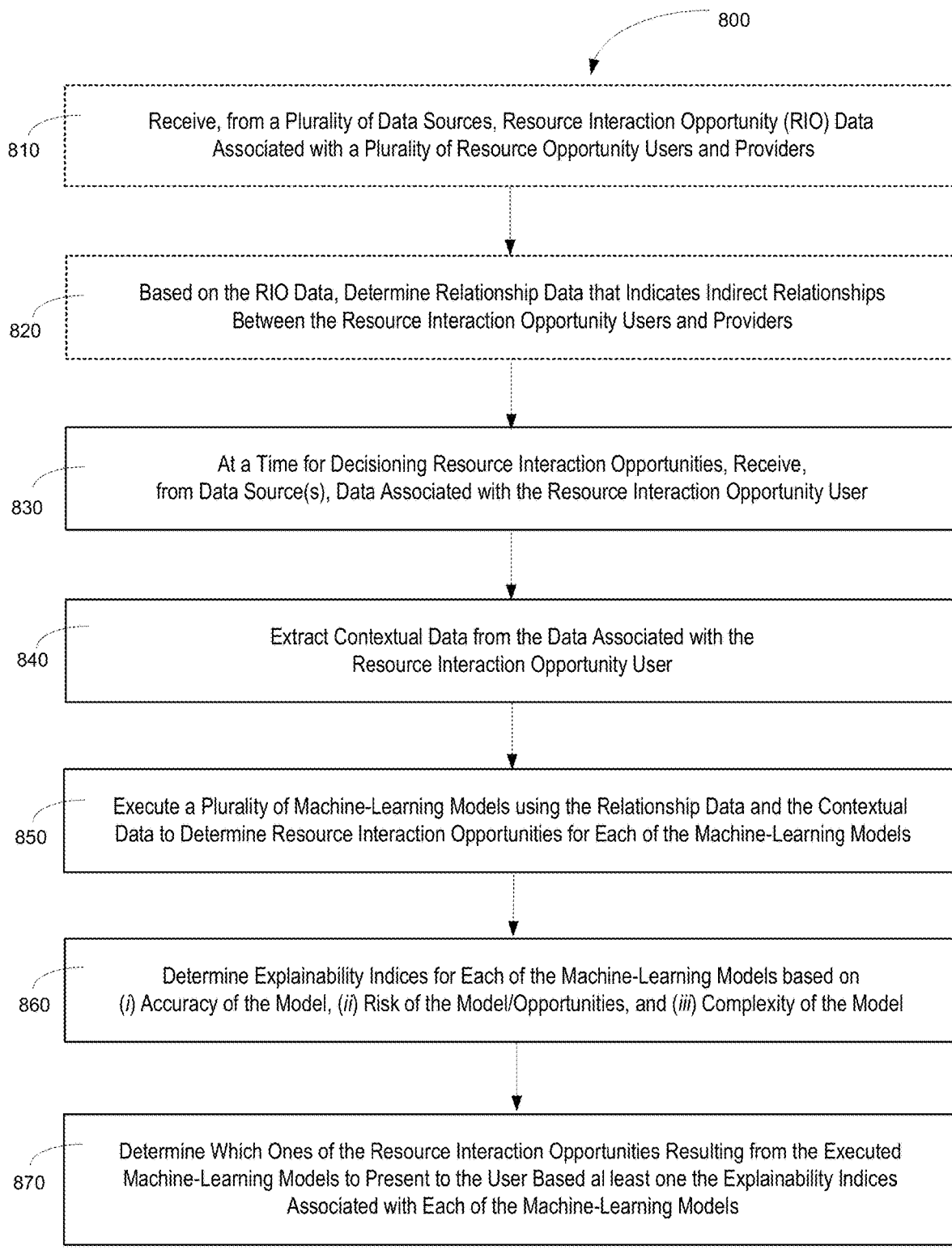

Having thus described embodiments of the disclosure in general terms, reference will now be made to the accompanying drawings, wherein:

FIG. 1 is a block diagram of a system for decisioning resource interaction opportunities, in accordance with some embodiments of the present disclosure;

FIGS. 2 and 3 are block diagrams of a system for decisioning resource interaction opportunities, in accordance with alternate embodiments of the present invention;

FIG. 4 is flow diagram showing the overall process for relationship network determination, context information extraction and resource interaction opportunity decisioning, in accordance with embodiments of the present invention;

FIG. 5 is a flow diagram of the process for resource interaction opportunity decisioning implementing an explainability calculator, in accordance with some embodiments of the present invention; and FIG. 6 is flow diagram of a method for resource interaction opportunity decisioning, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

Thus, systems, apparatus, and methods are described in detail below for improved decisioning of resource interaction opportunities for potential users. In specific embodiments of the invention resource interaction opportunities may be offers, discounts or the like provided by merchants to existing or potential customers. In further specific embodiments of the invention, the resource interaction opportunities are provided by a third party entity, such as a financial institution or the like, that has an established relationship with both the resource interaction opportunity providers (e.g., small businesses or the like) and resource interaction opportunity users (e.g., retail/consumer customers).

Specifically, the present invention implements a contextual information extractor that is configured to extract/compile contextual data associated with the decisioning process to insure the relevancy, accuracy and timeliness of the decision. In this regard, the contextual information extractor is capable of extracting information in real-time associated with an event, such as a contemplated or ongoing resource interaction, that triggers the decisioning. For example, the event may be a contemplated or ongoing transaction being considered or conducted by a potential user of a resource interaction opportunity (e.g., offer, discount or the like). In this regard, the decisioning process is able to determine resource interaction opportunities (i.e., offers, discounts) for the contemplated or ongoing transaction or for subsequent transactions related to the contemplated or ongoing transaction.

In addition, the systems, computer-program products, methods and/or the like herein provide for a decisioning process that determines the optimal machine-learning model/algorithm to use in the decisioning process through implementation of an explainability calculator. The explainability calculator is configured to determine one or more explainability indices that take into account the accuracy, peril and complexity of the model/algorithm in respect to the opportunities resulting from the model/algorithm. In this regard, the present invention insures that the optimal model is used to determine the resource interaction opportunities based on the context/circumstances for the decisioning.

Moreover, in additional embodiments of the invention, a relationship builder is implemented to determine which resource interaction providers have indirect relationships with the potential users, such that the decisioning process results in resource interaction opportunities provided by the direct and/or indirectly related resource interaction opportunity providers. In this regard, the relationship builder is configured to build, on an ongoing basis, a relationship network that indicates direct and indirect relationships between the potential users/offerees and the resource interaction opportunity providers/offerors. Subsequently, the relationship data resulting from the relationship builder is used as a determinative factor in determining which resource interaction opportunity to present to the potential user, resulting in resource interactions opportunities that are more focused and beneficial to the potential user.

As such, the present invention insures that the resource interaction opportunities presented to the potential user are ones that are the most relevant to the current context of the potential user and provided by resource interaction opportunity providers that are directly or indirectly related to the potential user (i.e., the resource interaction opportunities that the potential user is most likely to accept/act upon).

FIG. 1 illustrates a block diagram of a computing platform 100 for decisioning resource interaction opportunities, in accordance with embodiments of the present invention. The computing platform 100 includes a memory 110 and one or more processor devices 120 in communication with the memory 110. The memory 110 of computing platform 120 stores contextual information extractor module 130 and resource interaction opportunity decisioning module 140, which are executable by the one or more processor devices 120.

Contextual information extractor module 130 is configured to, at the time for performing the decisioning of the resource interaction opportunities (i.e., at run-time), receive, from first data sources, data 132 associated with the resource interaction opportunity user 200 and extract context data 134 from the data.

Resource interaction opportunity decisioning model 140 includes a plurality of machine-learning models/algorithms 150, such as one or more normal linear regression models, one or more deep learning models, one or more Bayesian network models or the like. The resource interaction opportunity decisioning module 140 is configured to receive the context data 134 from the contextual information extractor module 130 and execute at least two of the machine-learning models 150 using at least the context data 134 to determine one or more resource interaction opportunities 160 for each of the executed machine-learning models.

Additionally, the resource interaction opportunity decisioning model 140 includes an explainability calculator 170 that is configured to be implemented to determine one or more explainability indices 172 for each of the executed machine-learning models 150. Each explainability indices 172 are based on one or more of (i) the accuracy 174 of the corresponding machine-learning model 150, (ii) the peril 176 associated with the resource interaction opportunities 160 determined by the corresponding machine-learning model 150 and (iii) a complexity 178 factor associated with the machine-learning model 150. In response to implementing the explainability calculator 170, the resource interaction opportunity determiner 180 is executed to determine which of the one or more resource interaction opportunities 160 from a selected one of the machine-learning models 150 to present to the resource interaction opportunity user 200 based at least on the explainability indices 172 associated with each of the executed machine-learning models 150.

Referring to FIGS. 2 and 3 shown is a more detailed block diagram of a computing platform 100 configured for decisioning resource interaction opportunities, in accordance with embodiments of the present invention. The computer platform 100 be embodied in one or more computing devices (e.g., servers, mainframes, storage devices, personal computers (PCs) or the like) capable of executing computer-readable instructions. The computing platform 100 is configured to execute computer-readable instructions, such as algorithms, modules, routines, applications and the like.

Computing platform 100 includes memory 110, which may comprise volatile and non-volatile memory, such as read-only and/or random-access memory (RAM and ROM), EPROM, EEPROM, flash cards, or any memory common to computer platforms). Moreover, memory 110 may comprise cloud storage, such as provided by a cloud storage service and/or a cloud connection service.

Further, computing platform 110 also includes one or more processor devices 120, which may be an application-specific integrated circuit ("ASIC"), or other chipset, logic circuit, or other data processing device. Processor device 120 may execute an application programming interface ("API") (not shown in FIG. 2) that interfaces with any resident instructions, such contextual information extractor module 130, resource interaction opportunity decisioning module 140, relationship builder module 190, resource interaction opportunity tracking module 210, resource interaction opportunity presentation module 220 and sub-modules associated therewith or the like stored in the memory 110 of the computing platform 100.

Processor device(s) 120 may include various processing subsystems (not shown in FIG. 1) embodied in hardware, firmware, software, and combinations thereof, which enable the functionality of the computing platform and the operability of the computing platform on a distributed computing network. For example, processing subsystems allow for initiating and maintaining communications and exchanging data with other networked devices. For the disclosed aspects, processing subsystems of processor device 120 may include any subsystem used in conjunction contextual information extractor module 130, resource interaction opportunity decisioning module 140, relationship builder module 190, resource interaction opportunity tracking module 210, resource interaction opportunity presentation module 220 and related sub-instructions, sub-routines, algorithms, sub-algorithms, modules, sub-modules thereof.

Computing platform 100 may additionally include a communications mechanism (not shown in FIG. 2) embodied in hardware, firmware, software, and combinations thereof, that enables electronic communications between the one or more computing devices of the computing platform 100 and other networks and devices. Thus, communication mechanism may include the requisite hardware, firmware, software and/or combinations thereof for establishing and maintaining a wired and/or wireless network communication connection.

In optional embodiments of the invention, the memory 110 of computing platform 100 stores relationship builder module 190 which is executable by the one or more processor devices 120 and configured to receive resource interaction opportunity (RIO) data 192 associated with RIO users 200 and RIO providers 300 and, based on the data 192 determine relationship data that indicates indirect relationships 194 between the RIO users 200 and the RIO providers 300. In specific embodiments of the invention of the data 192 includes, but is not limited to, (i) historical resource interaction data of previous resource interactions conducted by the RIO users 200 and RIO providers 300, (ii) feedback data from the RIO users 200 and RIO providers 300, (iii)

RIO user 200 and RIO provider 300 information data including resource interaction opportunity preference data, (iv) previous resource interaction opportunity acceptance and rejection data, and (v) RIO user 200 and RIO 300 provider information changes, such as change in address and the like.

In specific embodiments of the invention, the relationship builder module 190 is configured to establish a relationship network, such as a multipartite network or the like, which indicated the indirect relationships 194 between the resource interaction opportunity users 200 and providers 300. In specific embodiments of the invention, the relationship network is established by calculating weighted distances between a plurality factors associated with previous resource interactions conducted by the resource interaction opportunity users 200 and providers 300. The factors may include, but are not limited to, time of resource interaction, type of resource interaction, category of resource interaction, volume of resource interaction, re-occurrence of resource interactions, parties to the resource interaction and the like. Based on the calculated weighted distances, resource interaction patterns, which are used to build a multipartite relationship network.

The memory 110 of computing platform 100 additionally stored contextual information extractor module 130 that is executable by the one or more processor devices 120 at runtime (i.e., the time for making a resource interaction opportunity decision) and configured to receive, from first data sources, data 132 associated with the resource interaction opportunity user 200 and extract context data 134 from the data.

The first data sources may include an event hub 600 that may include real-time data associated with a user event that triggers the resource interaction opportunity decisioning, such as a contemplated or ongoing resource interaction being considered or currently conducted by the user. For example, the user may be considering or conducting a transaction and the real-time data may include the type of transaction, the amount of the transaction, the entity/business that the user is transacting with, and the like.

In addition, the event hub or some other first data source may store historical data associated with previous user events, such as previous resource interactions conducted between the users and various resource interaction providers. The historical data may indicate usage patterns 138 associated with a user, such as temporal patterns in resource interactions (i.e., specific date/time or date/time ranges), resource interaction-type patterns, resource interaction provider patterns or the like. The contextual information extractor 130 may be configured to (i) receive the usage patterns 138 from the first data sources or, in other embodiments of the invention, (ii) receive raw data associated with the previous user events and, in response, determine the usage patterns 138 associated with the user.

In addition, the data sources may include sources, such as mobile user device, capable of providing geo-location data 139 indicating the current geographic location of the user and/or the historical locations of the user while conducting previous user events.

The memory 10 of computing platform 100 stores resource interaction opportunity decisioning module 140, which, as previously discussed, includes a plurality of machine-learning models/algorithms 150, such as one or more normal linear regression models, one or more deep learning models, one or more Bayesian network models or the like. The resource interaction opportunity decisioning module 140 is configured to receive the context data 134 from the contextual information extractor module 130 and, in some embodiments of the invention, the indirect relationship data 194 from the relationship builder module 190 and execute at least two of the machine-learning models 150 using at least the context data 134 and, in some embodiments the indirect relationship data 194 to determine one or more resource interaction opportunities 160.

The resource interaction decisioning module 140 additionally includes an explainability calculator 170 that is configured to be implemented to determine one or more explainability indices 172 for each of the executed machine-learning models 150. Each explainability indices 172 are based on one or more of (i) the accuracy 174 of the corresponding machine-learning model 150, (ii) the peril 176 associated with the resource interaction opportunities 160 determined by the corresponding machine-learning model 150 and (iii) a complexity 178 factor associated with the machine-learning model 150. In specific embodiments of the invention, the explainability indices may be a category or a score; for example, an individual category or score for each of (i) accuracy 174, (ii) peril 176, and (iii) complexity 178 and/or an overall category or score that accounts for all of (i) accuracy 174, (ii) peril 176, and (iii) complexity 178. In specific embodiments of the invention, the explainability calculator 170 implements a tree interpretation methodology to calculate the explainability indices.

In response to implementing the explainability calculator 170, the resource interaction opportunity determiner 180 (i.e., model selector) is executed to select which of the executed machine-learning models 150 to use (i.e., which of the one or more resource interaction opportunities 160 from the selected one of the machine-learning models 150) to present to the resource interaction opportunity user 200 based at least on the explainability indices 172 associated with each of the executed machine-learning models 150. In specific embodiments of the invention, the resource interaction opportunity determiner 180 is configured to be self-learning and, as such, over time, takes into account historical acceptance/rejection of previously presented resource interaction opportunities in making the determination as to which model 150 to select and/or which resource interaction opportunities 160 from the selected model 150 to present to the resource interaction opportunity user 200. As such, in specific embodiments of the invention, the memory 110 of computing platform 100 includes resource interaction opportunity tracking module 210 that is configured to track user acceptance 212 and declination/rejection 214 of resource interaction opportunities 160. Such tracking may include, but is not limited to, the type of resource interaction opportunities accepted and declined, the date/time of acceptance/rejection, the volume and rate of acceptance/rejection and the like. As previously discussed the results of the tracking are stored in an associated database and relied upon, at run-time, for subsequent resource interaction opportunity decisioning.

Referring to FIG. 3, the memory 110 of computing platform 100 additionally stores a resource interaction opportunity presentation module 220 that is configured to present the resource interaction opportunities 160 to the resource interaction opportunity user 200, in accordance with embodiments of the present invention. In specific embodiments of the invention in which initiating a resource interaction event 222, such as a transaction or the like triggers the resource interaction decisioning process, the presentation module 220 may be configured to communicate an alert 224 to the user 200 that includes one or more of the determined resource interaction opportunities 160. The alert 224 may take the form of text/short message service (SMS) communication, an email or the like, which can be communicated and comprehended by the user 200 while the user is contemplating, initiating, conducting or just completed a resource interaction event 222. In this regard, the resource interaction opportunities 160 may affect the ongoing resource interaction event 220 or, in the event that the resource interaction event 222 is just completed, the resource interaction opportunities 160 may be related to the just completed event/transaction (e.g., completed event is a transaction for golf clubs, the subsequent opportunity may be an offer for a discount on golf balls).

In other embodiments of the invention, the resource interaction opportunity presentation module 220 is configured to be incorporated within an online portal 226 and/or a mobile application 228. For example, in those embodiments of the invention in which the resource interaction opportunities are offered by a third party, such as a financial institution, the resource interaction opportunities may be presented within the third party's website/online portal 226 and/or mobile application 228. In such embodiments of the invention, the logging-on/accessing of the online portal 226 or mobile application 228 may trigger the resource interaction opportunity decisioning process. In such embodiments of the invention, since a specific resource interaction event 222 is not the trigger for the decisioning process, the context data 134 used in the decisioning process may take into account all or a portion of the previous resource interaction events 222 conducted by the user 200 since the previous decisioning process (i.e., since the last time resource interaction opportunities 160 were presented to the user 200).

Referring to FIG. 4 a flow diagram is presented of a method for relationship building, context information extraction, resource interaction opportunity decisioning and presentation, in accordance with embodiments of the invention. Pre-decisioning run-time, otherwise referred to as training mode, first data sources 500 receive data associated with resource interaction opportunity users 200 and resource interaction opportunity providers 300. In specific embodiments of the invention, in which the decisioning entity is a third-party, e.g., a financial institution, the resource interaction opportunity users 200 may be retail/consumer customers, the resource interaction opportunity providers may be small business customers and resource interaction opportunity may be an offer, discount or benefit proved by the small business customer to the retail/consumer. As such, the first data sources 500 may include, but are not limited to, resource interaction database 510 that stores historical data pertaining to resource interactions conducted between users 200 and providers 300. In those embodiments in which the users 200 are retail/consumer financial institution customers and the providers 300 are small business customers the resource interaction may be financial transaction or other non-financial interactions. The first data sources 500 may additionally include feedback database 520 that stores inputs provided by the users 200 and providers 300, user/provider preference database 530, which may take the form of user/provider information databases or the like. In addition first data sources may include historical resource interaction opportunity acceptance/rejection database 540 that stores data related to user's acceptance and rejection of previous resource interaction opportunities and personal/information change database 550 that stores changes to a user or provider personal data, such as change in address/location or the like.

Relationship builder 190 receives the data from the first data sources 500. The data may be received on a scheduled basis (e.g., weekly) or may be configured to be received continuously as new data is received by the data sources 500. As previously discussed, relationship builder 190 uses the data to establish a relationship network between users 200 and providers 300 that indicates indirect relationships between the users 200 and providers 300. In specific embodiments of the invention, the relationship builder 190 calculates the weighted distances between relationship factors (e.g., time of resource interaction, type of resource interaction and the like) and builds a relationship pattern. Based on the relationship patterns an multipartite relationship network is established that provides insight into indirect relationships between the users 200 and the providers 300.

At resource interaction opportunity decisioning run-time, contextual information extractor 130 will extract context data for the decisioning process. Specifically, contextual information extractor 130 is configured to receive event information from event hub 600. The event hub 600 may provide real-time resource interaction event data to the contextual information extractor 130 in those embodiments of the invention in which the event is a contemplated/ongoing or immediately completed resource interaction. In other words, the event hub 600 may communicate current event data to the contextual information extractor 130 at run-time. In other embodiments of the invention, the event hub 600 is configured to store or have access to data associated with historical resource interactions conducted by users 200, such as previous transactions conducted by the users 200. In addition, the contextual information extractor 130 is configured to receive data from other sources, such as, but not limited to, first data sources 500. The data received by the contextual information extractor 130 may include or indicate user usage patterns, such as transaction patterns (e.g., reoccurring purchases—same transaction, same time/date or the like), geo-location of the user 200 at the time of the current or historical resource interaction or the like. Based on the data received, the contextual information extractor 130 is able to extract the data that is needed for current run-time decisioning process. In this regard, the contextual information extractor 130 is configured to ascertain which data is relevant to the current run-time decisioning process and extract/parse such data from the totality of data received.

The resource interaction opportunity decision maker 140 receives and uses the context data from the contextual information extractor 130 and the relationship data from the relationship builder 190 to determine resource interaction opportunities for the user 200. Specific details of the methodology for the resource interaction opportunity decision maker 140 are discussed in relation to FIG. 5, infra. In response to decisioning the resource interaction opportunities, resource interaction opportunity presenter 220 is configured to present the resource interaction opportunities to the user. In specific embodiments of the invention, such as when the resource interaction opportunity decisioning is triggered by a current event (e.g., user contemplating, initiating, conducting or completing a transaction), the presentation may comprise generating and communicating an alert to the user 200 that includes or provides access to one or more of the resource interaction opportunities. In other embodiments of the invention the users 200 may logon/access a mobile application or online portal to be presented with one or more resource interaction opportunities. Additionally, the providers 300 may logon/access a mobile application or online portal to view statistics (e.g., resource interaction opportunities outstanding, acceptance/rejection rates and the like) related to their resource interaction opportunities.

In response to presenting the resource interaction opportunities to the user, resource interaction opportunity tracking/feedback tracks and stores data associated with users' acceptance and rejection (tacit or implied through failure to accept) of resource interaction opportunities. As previous discussed, resource interaction opportunity tracking/feedback data is subsequently used by the resource interaction opportunity decision maker 140 to determine resource interaction opportunities that are more relevant to the user and/or more likely that the users will accept.

Referring to FIG. 5 a flow diagram is presented of a method for resource interaction opportunity decisioning, in accordance with embodiments of the invention. The resource interaction opportunity decision maker 140 is configured to receive contextual data 134 from the contextual information extractor 130, relationship data 194 from the relationship builder 190 and user event data 137 from event hub 600. The resource interaction opportunity decision maker 140 includes a plurality of machine-learning models 150-1, 150-2 . . . 150Nth, which receive the data 134, 194 and 137 and run the models to determine resource interaction opportunities. The results of each machine-learning model are passed to an explainability calculator 170 that is configured to use tree interpretation methodology to calculate one or more explainability indices for each of the executed machine-learning models 150-1, 150-2 . . . 150Nth. Based on the one or more explainability indices, the resource interaction opportunity model selector 180 is configured to select one of the executed machine-learning models 150-1, 150-2 . . . 150Nth as the model from which the resulting resource interaction opportunities 160 will be presented to the user. The model selector is configured to refer domain knowledge base to domain specific information and apply a function that is dependent upon (i) accuracy of the model, (ii) peril impact specific to the third-party entity managing the opportunity program, and (iii) complexity of the model. In addition the model selector may be configured to self-learn based on previous acceptance/rejection of resource interaction opportunities by the user. As such, acceptance/rejection tracking results are stored in historical resource interaction opportunity database 700 and are communicated to the model selector 180 at run-time.

Referring to FIG. 6 a flow diagram is presented of a method 800 for resource interaction opportunity decisioning, in accordance with embodiments of the present invention. At optional Event 810, resource interaction opportunity data associated with users and providers is received from first data sources. The data may include, but is not limited to, historical resource interaction data, feedback data, user/provider preference data, previous opportunity acceptance/rejection data, personal change data and the like. Based on the resource interaction opportunity data, at optional Event 820, relationship data is determined that indicates indirect relationships between the resource interaction opportunity users and providers. In specific embodiments of the invention, a relationship network is established by calculating weighted distances between various factors associated with previous resource interactions between users and providers to build relationship patterns. The patterns are subsequently the basis for building a multipartite relationship network, which indicates the indirect relationships.

At a time for decisioning resource interaction opportunities (i.e.) runtime, for example, when a user conducts a triggering event, such as contemplating, initiating, conducting or completing a resource interaction, accessing on online portal or mobile application, at Event 830, data associated with the resource interaction opportunity user is received from second data sources. The second data sources may include an event hub, a usage pattern database, a user device configured to provide geo-location data and the like. At Event 840, contextual data/information is extracted from the data associated with the user received from the second data sources. The contextual information that is extracted is information that is relevant to the current resource interaction opportunity decisioning process.

At Event 850, a plurality of machine-learning models are executed using the contextual data and the relationship data to determine resource interaction opportunities for each of the executed models. At Event 860, one or more explainability indices are determined/calculated for each executed machine-learning model. In specific embodiments of the method, the explainability indices are based on (i) accuracy of the model, (ii) peril impact specific to the third-party entity managing the opportunity program, and (iii) complexity of the model. At Event 860, based at least one the explainability indices, one of the executed machine-learning models is selected from which the resulting resource interaction opportunities are presented to the user. In additional embodiments historical results (i.e., acceptance/rejection) of previously presented resource interaction opportunities are used as determinative factors in selecting a model and/or the resource interaction opportunities resulting from execution of the selected machine-learning model.

Thus, present embodiments of the invention, including systems, computer program products, methods and/or the like, provide for accurate resource interaction opportunity decisioning. Specifically, the invention provides for extracting contextual information, in real-time or otherwise, that takes into account the circumstances precipitating the presentation of resource interaction opportunities to the potential user. In addition, the invention provides for determining which decisioning model to use from amongst a plurality of models based on the accuracy, peril and complexity of the models in relation to the resource interaction opportunity decisions rendered by the models. Moreover, in additional embodiments of the invention, a relationship builder is implemented that is configured to build a relationship network amongst potential users and resource interaction opportunity providers and subsequently uses the network as a basis for determining which resource interaction opportunity providers should provide resource interaction opportunities to the potential users.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for decisioning resource interaction opportunities, the system comprising:
a computing platform including a memory and at least one processor in communication with the memory;

a contextual information extractor module stored in the memory, executable by the least one processor and configured to:
  in response to a resource interaction opportunity user initiating processing of a resource interaction event, receive, from one or more first data sources, data associated with the resource interaction opportunity user, and
  extract contextual data from the data associated with the resource interaction opportunity user;
a relationship builder module stored in the memory, executable by the at least one processor and configured to:
  receive, from a plurality of second data sources, (i) resource interaction opportunity user data associated with a plurality of resource interaction opportunity users, and (ii) resource interaction opportunity provider data associated with a plurality of resource interaction opportunity providers,
  based on the source interaction opportunity user data and the resource interaction opportunity provider data, establish a relationship network between a plurality of resource interaction opportunity users and a plurality of resource interaction opportunity providers by (i) calculating weighted distances between a plurality factors of previous resource interactions conducted by the plurality of resource interaction opportunity users and the plurality of resource interaction opportunity providers, (ii) determining resource interaction patterns for the plurality of resource interaction opportunity users and the plurality of resource interaction opportunity providers, and (iii) establishing the relationship network based on the resource interaction patterns, wherein the relationship network identifies indirect relationships between the plurality of resource interaction opportunity users and the plurality of resource interaction opportunity providers;
a resource interaction opportunity decisioning module including a plurality of machine-learning models and an explainability calculator, wherein the resource interaction opportunity decisioning module is stored in the memory, executable by the at least one processor and configured to:
  concurrent with processing of the resource interaction event, receive the contextual data from the contextual information extractor module and the relationship data from the relationship builder module,
  execute at least two of the machine-learning models using the contextual data and the relationship data as inputs to determine one or more resource interaction opportunities for each of the executed machine-learning models,
  implement the explainability calculator to determine one or more explainability indices for each of the executed machine-learning models, wherein the explainability indices are at least one of a score or a category for (i) an accuracy of a machine-learning model, (ii) a peril associated with the one or more resource interaction opportunities determined by a machine-learning model and (iii) a complexity factor associated with the machine-learning model, and
  determine which of the one or more resource interaction opportunities resulting from one of the executed machine-learning models to present to the resource interaction opportunity user based at least on the one or more explainability indices associated with each of the executed machine-learning models; and
a resource interaction opportunity presentation module stored in the memory, executable by the processor and configured to launch on a user device in response to a user initiating the resource interaction event, and present to the resource interaction opportunity user the one or more resource interaction opportunities determined by the resource interaction opportunity decisioning module while the resource interaction event is being processed.

2. The system of claim 1, wherein the contextual information extractor is further configured to receive, from the first data sources, the data associated with the resource interaction opportunity user, wherein the first data sources include an event hub that provides at least one of (i) real-time data associated with a current user resource interaction triggering the decisioning of the resource interaction opportunities, and (ii) historical data associated with previous resource interactions performed by the resource interaction opportunity user.

3. The system of claim 1, wherein the contextual information extractor is further configured to receive, from the first data sources, the data associated with the resource interaction opportunity user, wherein the first data sources include a user device configured to provide geo-location information that establishes a current location of the resource interaction opportunity user.

4. The system of claim 1, wherein the relationship builder is configured to receive the resource interaction opportunity user data and resource interaction opportunity provider data from the plurality of second data sources comprising a historical resource interaction database, feedback database, user and provider information database, and previous resource interaction opportunity acceptance database.

5. The system of claim 1, wherein the relationship builder module is configured to establish the calculating weighted distances between the plurality factors of previous resource interactions conducted by the resource interaction opportunity users and the resource interaction opportunity providers, wherein the plurality of factors include temporal proximity of previous resource interactions, type of resource interaction, volume of resource interaction, parties to a resource interaction, and re-occurrence of resource interaction.

6. The system of claim 1, wherein the resource interaction opportunity decisioning module is further configured to determine which of the one or more resource interaction opportunities resulting from one of the executed machine-learning models to present to the resource interaction opportunity user based at least on historical data associated with acceptance and rejections of previously presented resource interaction opportunities presented to the resource interaction opportunity user.

7. The system of claim 1, further comprising a resource interaction opportunity tracking module stored in the memory, executable by the at least one processor and configured to track and record acceptance and rejection of resource interaction opportunities by a plurality of resource interaction opportunity users.

8. A computer program product comprising:
a non-transitory computer-readable medium comprising:
  a first set of codes for causing a computer to, in response to a resource interaction opportunity user initiating processing of a resource interaction event, receive, from one or more first data sources, data associated with the resource interaction opportunity user, and extract contextual data from the data associated with the resource interaction opportunity user;
a second set of codes for causing a computer to receive, from a plurality of second data sources, (i) resource interaction opportunity user data associated with a plurality of resource interaction opportunity users, and (ii) resource interaction opportunity provider data associated with a plurality of resource interaction opportunity providers, and based on the source interaction opportunity user data and the resource interaction opportunity provider data, establish a relationship network between a plurality of resource interaction opportunity users and a plurality of resource interaction opportunity providers by (i) calculating weighted distances between a plurality factors of previous resource interactions conducted by the plurality of resource interaction opportunity users and the plurality of resource interaction opportunity providers, (ii) determining resource interaction patterns for the plurality of resource interaction opportunity users and the plurality of resource interaction opportunity providers, and (iii) establishing the relationship network based on the resource interaction patterns, wherein the relationship network identifies indirect relationships between the plurality of resource interaction opportunity users and the plurality of resource interaction opportunity providers;
a third set of codes for causing a computer to, concurrent with processing of the resource interaction event, receive the contextual data and the relationship data, and execute at least two machine-learning models using the contextual data and the relationship data as inputs to determine one or more resource interaction opportunities for each of the executed machine-learning models;
a fourth set of codes for causing a computer to determine one or more explainability indices for each of the executed machine-learning models, wherein the explainability indices are at least one of a score or a category for (i) an accuracy of a machine-learning model, (ii) a peril associated with the one or more resource interaction opportunities determined by a machine-learning model and (iii) a complexity factor associated with the machine-learning model;
a fifth set of codes for causing a computer to determine which of the one or more resource interaction opportunities resulting from one of the executed machine-learning models to present to the resource interaction opportunity user based at least on the one or more explainability indices associated with each of the executed machine-learning models; and
a sixth set of codes for causing a computer to launch an application on a user device in response to a user initiating the resource interaction event, and present via the application to the resource interaction opportunity user the one or more resource interaction opportunities determined by the resource interaction opportunity decisioning module while the resource interaction event is being processed.

9. The computer program product of claim 8, wherein the first set of codes is further configured to cause the computer to receive, from the first data sources, the data associated with the resource interaction opportunity user, wherein the first data sources include an event hub that provides at least one of (i) real-time data associated with a current user resource interaction triggering the decisioning of the resource interaction opportunities, and (ii) historical data associated with previous resource interactions performed by the resource interaction opportunity user.

10. A computer-implemented method for decisioning resource interaction opportunities, the method executed by one or more computing device processors and comprising:
in response to a resource interaction opportunity user initiating processing of a resource interaction event, receiving, from one or more first data sources, data associated with the resource interaction opportunity user;
extracting contextual data from the data associated with the resource interaction opportunity user;
receiving, from a plurality of second data sources, (i) resource interaction opportunity user data associated with a plurality of resource interaction opportunity users, and (ii) resource interaction opportunity provider data associated with a plurality of resource interaction opportunity providers;
based on the source interaction opportunity user data and the resource interaction opportunity provider data, establishing a relationship network between a plurality of resource interaction opportunity users and a plurality of resource interaction opportunity providers by (i) calculating weighted distances between a plurality factors of previous resource interactions conducted by the plurality of resource interaction opportunity users and the plurality of resource interaction opportunity providers, (ii) determining resource interaction patterns for the plurality of resource interaction opportunity users and the plurality of resource interaction opportunity providers, and (iii) establishing the relationship network based on the resource interaction patterns, wherein the relationship network identifies, wherein the relationship network indicates indirect relationships between the plurality of resource interaction opportunity users and the plurality of resource interaction opportunity providers;
concurrent with processing of the resource interaction event, and executing at least two machine-learning models using the contextual data and the relationship data as inputs to determine one or more resource interaction opportunities for each of the executed machine-learning models;
determining one or more explainability indices for each of the executed machine-learning models, wherein the explainability indices are at least one of a score or a category for (i) an accuracy of a machine-learning model, (ii) a peril associated with the one or more resource interaction opportunities determined by a machine-learning model and (iii) a complexity factor associated with the machine-learning model;
determining which of the one or more resource interaction opportunities resulting from one of the executed machine-learning models to present to the resource interaction opportunity user based at least on the one or more explainability indices associated with each of the executed machine-learning models; and
launching an application on a user device in response to a user initiating the resource interaction event, and presenting via the application to the resource interaction opportunity user the one or more resource interaction opportunities determined by the resource interaction opportunity decisioning module while the resource interaction event is being processed.

* * * * *